United States Patent
Ahn et al.

(10) Patent No.: US 11,868,086 B2
(45) Date of Patent: Jan. 9, 2024

(54) 3D HOLOGRAPHIC IMAGING APPARATUS AND METHOD FOR PROJECTING MULTIPLE POINT LIGHT SOURCES TO ONE PLANE

(71) Applicant: Korea Advanced Institute of Science and Technology, Daejeon (KR)

(72) Inventors: Jaewook Ahn, Daejeon (KR); Haeun Sun, Daejeon (KR); Yunheung Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 174 days.

(21) Appl. No.: 17/331,770

(22) Filed: May 27, 2021

(65) Prior Publication Data
US 2022/0206433 A1 Jun. 30, 2022

(30) Foreign Application Priority Data

Dec. 30, 2020 (KR) .................. 10-2020-0187475

(51) Int. Cl.
*G03H 1/04* (2006.01)
*H04N 13/254* (2018.01)

(52) U.S. Cl.
CPC ......... *G03H 1/0443* (2013.01); *G03H 1/0465* (2013.01); *H04N 13/254* (2018.05);
(Continued)

(58) Field of Classification Search
CPC .. G03H 1/2294; G03H 1/0443; G03H 1/0005; G03H 2210/30; G03H 1/0866;
(Continued)

(56) References Cited

U.S. PATENT DOCUMENTS

2021/0166147 A1\* 6/2021 Kim .................. G02F 3/00

OTHER PUBLICATIONS

Nelson, Karl D., et al., "Imaging Single Atoms in a Three-Dimensional Array," *Nature Physics*, 3, 8, 2007 (pp. 556-560).
(Continued)

*Primary Examiner* — Farhan Mahmud
(74) *Attorney, Agent, or Firm* — NSIP Law

(57) ABSTRACT

The present invention relates to a 3D holographic imaging apparatus and method for projecting multiple point light sources to one plane such that qubits can be detected at rapid rate by allowing a 3D qubit model arranged in three dimensions to be simultaneously photographed in two dimensions. For this, the present invention provides a 3D holographic imaging apparatus comprising: a fluorescent unit configured to cause each qubit composing a 3D qubit model to emit qubit fluorescent beams; a lens unit configured to change the qubit fluorescent beams to a desired route; a light modulator configured to modulate each phase of the qubit fluorescent beams for each predetermined position, and control a position of a focal point; and an imaging unit configured to image the qubit fluorescent beams modulated by the light modulator in a two-dimensional (2D) image. Therefore, according to the present invention, it is possible to greatly reduce the preparation and detection time of the 3D qubit model and increase the number of detectable qubits.

3 Claims, 7 Drawing Sheets

(52) U.S. Cl.
CPC ..... *G03H 2223/19* (2013.01); *G03H 2223/22* (2013.01); *G03H 2225/32* (2013.01)

(58) Field of Classification Search
CPC ............ G01N 21/6458; G02B 21/0076; G02B 21/0032; G02B 21/16; G02B 5/32; G02B 21/0056
See application file for complete search history.

(56) References Cited

OTHER PUBLICATIONS

Lee, Woojun, et al., "Three-Dimensional Rearrangement of Single Atoms using Actively Controlled Optical Microtraps," *Optics express*, 24, 9, 2016 (pp. 9816-9825).

Barredo, Daniel, et al., "Synthetic three-dimensional atomic structures assembled atom by atom," *Nature*, 561, 7721, 2018 (pp. 79-82).

* cited by examiner (a)

◎ Z = -3d     ◎ Z = -d

◯ Z = -2d     ◎ Z = 0

3D HOLOGRAPHIC IMAGING APPARATUS AND METHOD FOR PROJECTING MULTIPLE POINT LIGHT SOURCES TO ONE PLANE

CROSS-REFERENCE TO RELATED APPLICATIONS

This application claims the priority of Korean Patent Application No. 10-2020-0187475 filed on Dec. 30, 2020 in the Korean Intellectual Property Office, the disclosure of which is incorporated herein by reference.

BACKGROUND OF THE INVENTION

Field of the Invention

The present invention relates to a three-dimensional (3D) holographic imaging apparatus and method for projecting multiple point light sources to one plane, and specifically, to a 3D holographic imaging apparatus and method for projecting multiple point light sources to one plane such that qubits can be detected at rapid rate by allowing a 3D qubit model arranged in three dimensions to be simultaneously photographed in two dimensions.

Description of the Related Art

Each qubit as a minimum unit of quantum information needs to be able to be controlled in order to realize a quantum computer.

The qubits are capable of quantum superposition during coherence time differently from classical bits, and if such a characteristic is used, parallel processing of the qubits is available, from which it is possible to conduct faster calculation than classical computers. States of the qubits can be known by measuring a final result several times.

For example, if there are four qubits, the quantum computer does not sequentially calculate sixteen (24) operations like the conventional case, but instantly calculates the sixteen operations, thereby greatly increasing a processing rate.

However, there is difficulty in positioning multiple qubits in a defined space. If multiple qubits intend to be constituted, since there is a limit to a one-dimensional or two-dimensional arrangement, the qubits need to be arranged in three dimensions.

For this, as illustrated in FIG. 1, a 3D atomic structure may be produced by collecting each single atom, and as illustrated in FIG. 2, the 3D atomic structure may be divided into various planes to photograph atoms arranged in the same plane, respectively, and may measure what quantum states each atom has.

(K. D. Nelson, X. Li, D. S. Weiss, Nat Phys 3, 556-560 (2007),
D. Barredo, W. Lienhard, S. d. Lseleeuc, T. Lahaye, A. Browaeys, Natuzre 561, 79-82(2018),
W. Lee, H. Kim and J. Ahn, Opt. Express 24, 9816-9825 (2016))

However, in such a tomography method, it takes a considerable amount of time to detect a qubit state in the quantum computer that needs to instantly control the qubits. In other words, as the number of planes constituting three dimensions increases, the time of detecting the qubit state is proportionately lengthened. This leads to generating a measurement error (state preparation and measurement error: SPAM error) that the state is not properly measured because of a short capture time of atoms, and therefore, the method acts as an obstacle to the development of the quantum computer.

The abovementioned technical configuration is the background art for assisting the understanding of the present invention, and does not mean a conventional technology widely known in the art to which the present invention belongs.

SUMMARY OF THE INVENTION

The present invention is to solve the aforementioned problem, and specifically, to provide a 3D holographic imaging apparatus that can increase the number of detectable qubits by greatly reducing the time of detecting a 3D qubit model.

To achieve the objects, the present invention provides a 3D holographic imaging apparatus comprising: a fluorescent unit configured to cause each qubit composing a 3D qubit model to emit qubit fluorescent beams; a lens unit configured to change the qubit fluorescent beams to a desired route; a light modulator configured to modulate each phase of the qubit fluorescent beams for each predetermined position, and control a position of a focal point; and an imaging unit configured to image the qubit fluorescent beams modulated by the light modulator in a two-dimensional (2D) image.

The lens unit may comprise: a first lens configured to change routes of the qubit fluorescent beams emitted by the 3D qubit model; and a second lens configured to refract the qubit fluorescent beams passing through the light modulator to become a predetermined position of the focal point.

A phase delay plate changing a polarization direction and a polarization plate passing only specific polarization are preferably installed between the first lens and the second lens.

It is preferable to provide the light modulator on an XY plane perpendicular to an advancing direction of the imaging beam, store positions x, y and z of atoms belonging to the 3D qubit model, positions of the lens units and a position of the light modulator, and determine phases to be changed for each position on the XY plane of the light modulator based on the stored positions x, y and z of atoms, the stored positions of the lens units and the stored position of the light modulator.

According to the present invention, it is possible to greatly reduce the preparation and detection time of the 3D qubit model and increase the number of detectable qubits having a 3D structure by at least sixty-five.

In addition, since the number of 2D planes required in tomography does not need to be considered when preparing the 3D qubit model, and the degree of freedom for shape of the 3D qubit model is thus high, it is possible to greatly reduce the preparation time.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Configurations and functions of embodiments of the present invention will be described in detail with reference to the accompanying drawings.

Figure 1:
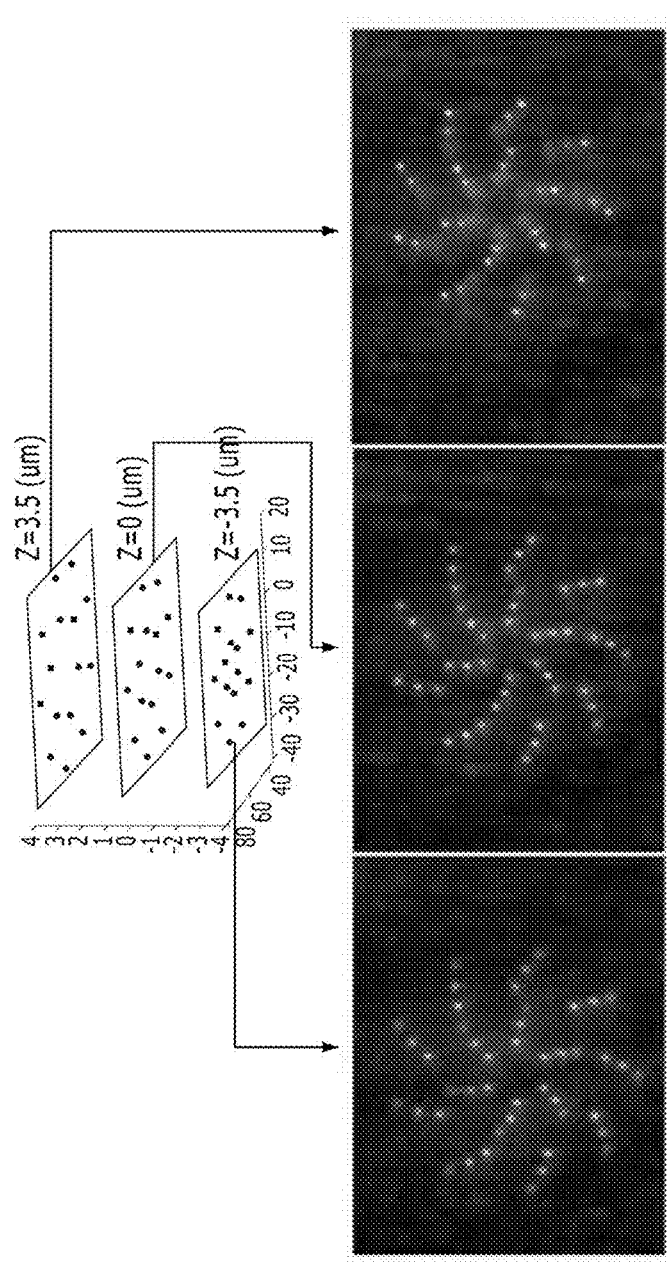
FIG. 1 is an image of imaging that atoms are arranged in three dimensions according to the related art.
Figure 2:
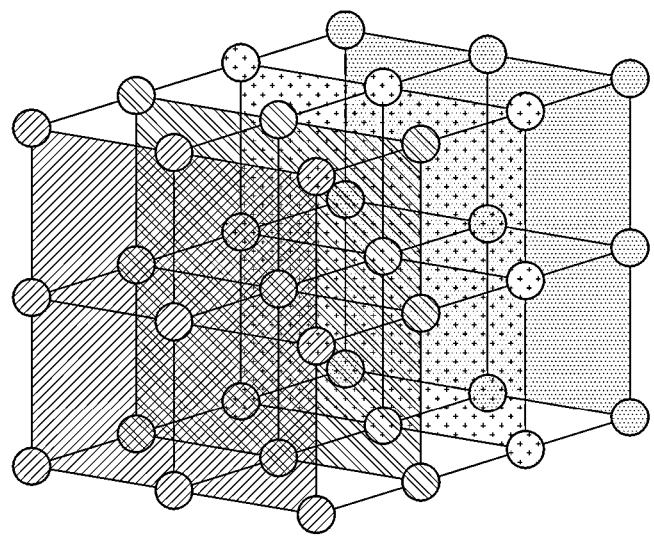
FIG. 2 is an explanatory diagram illustrating tomography used to photograph FIG. 1.
Figure 3:
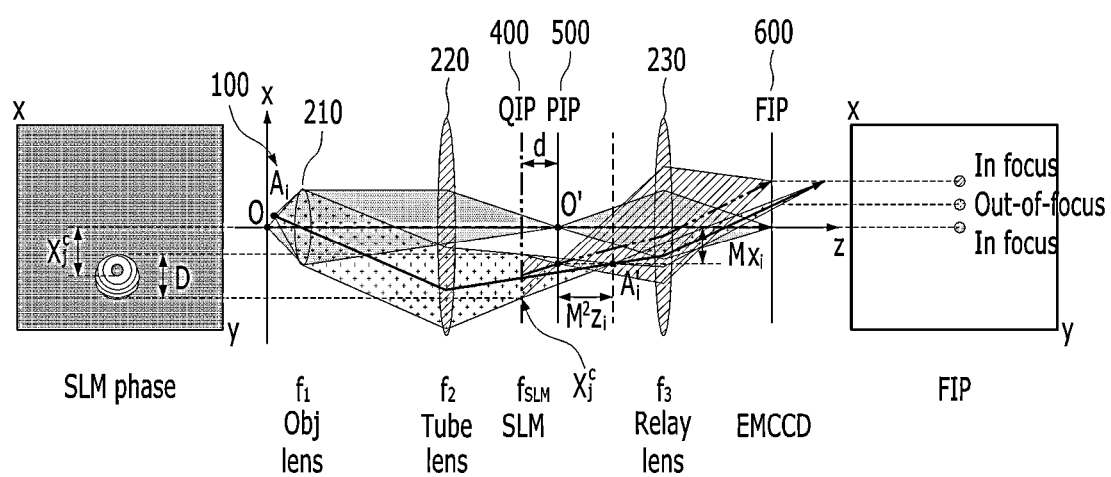
FIG. 3 is a configuration diagram illustrating a 3D holographic imaging apparatus according to the present invention.

Referring to FIG. 3, a 3D holographic imaging apparatus according to the present invention is configured to include a fluorescent unit 100, lens units 210, 220 and 230 and a light modulator 400, and an imaging unit 600.

A quantum operation which produces a qubit state is conducted by a Rydberg quantum computer (refer to Hyosub Kim et. al. "Detailed balance of thermalization dynamics in Rydberg atom quantum simulators," Phys. Rev. Lett. 120, 180502 (2018)) of the laboratory. A Rydberg state means that one atom is excited in a state with a very high principal quantum number, and an apparatus that performs the quantum operation using such a Rydberg state is referred to as the Rydberg quantum computer.

Figure 4A:
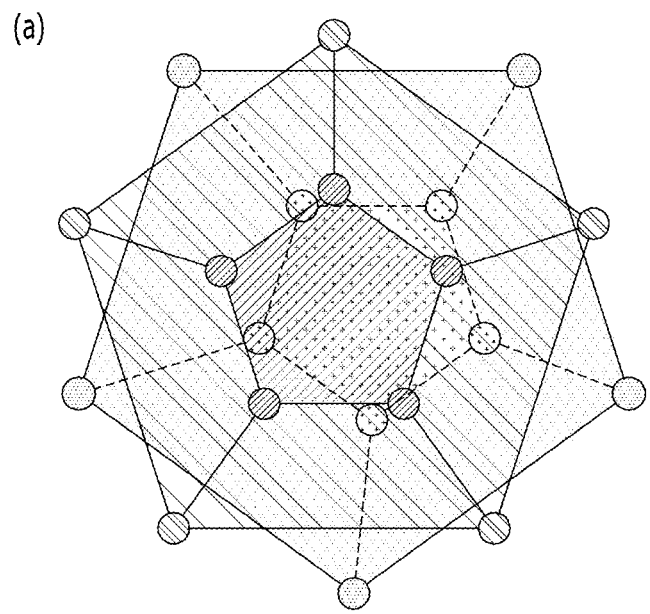
FIG. 4A is an exemplary diagram for a 3D qubit model.

FIG. 4A illustrates one example of the 3D qubit model, which represents a state that atoms are arranged in fixed positions on a 3D space.

In the embodiment, since the arrangement of the atoms in the 3D qubit model is not present on one plane, but is present in three dimensions, it may have a $(x_i, y_i, z_i)$ coordinate value for any i atom. The z coordinate may be set in a direction of advancing a qubit fluorescent beam by the fluorescent unit.

The atoms of the 3D qubit model are positioned in predetermined coordinates, and the position coordinates may be stored in the light modulator 400.

The fluorescent unit 100 serves as causing the qubit to emit the qubit fluorescent beam by applying an imaging beam using laser so as to photograph the 3D qubit model. At this time, a position of ith atom $A_i$ may be positioned spaced apart from a zero point in x and z directions.

The qubit fluorescent beam has a route that is changed as it passes through the lens units 210, 220 and 230. A lens constituting the lens units may be variously installed in different situations, and is not limited to the configurations of the embodiment which will be described hereinafter.

The lens unit may include a first lens 210, a second lens 220 and a third lens 230, and the first lens 210 and the second lens 220 may serve as enlarging the qubit fluorescent beams.

In other words, the first lens 210 may have a focal distance of f1=4 mm, and the second lens 220 may have a focal distance of f2=200 mm, resulting in configuring a 4f system. In that case, a position of a zero point (0') of a primary image plane (PIP) is (0, 2L), where L=f1+f2, and the PIP means a plane on which light radiated from the zero point (0) forms an image at first.

The qubit fluorescent beams passing through the first lens 210 are collected as they pass through the second lens 220, and the qubit fluorescent beams passing through the second lens 220 are incident into the light modulator 400.

The light modulator 400 may modulate light holographically using a spatial light modulator (SLM), and is positioned on a quasi-image plane (QIP). In other words, the light modulator 400 may be positioned in z=2L-d that is before the PIP by d in the z direction.

The light modulator 400 stores positions x, y and z of atoms belonging to the 3D qubit model, positions of the lens units, a position of the light modulator and positions on the light modulator corresponding to each of the atoms, and determines phases to be changed for each position on an XY plane of the light modulator based on the stored positions x, y and z of atoms, the stored positions of the lens units and the stored position of the light modulator.

The light modulator 400 changes the phases for each position X and Y on the light modulator corresponding to the positions x, y and z of each atom belonging to the 3D qubit model, and serves as generating a hologram for the 3D qubit model by changing an advancing direction.

In that case, a phase of the qubit fluorescent beam for an atom positioned in $A_i$ in the QIP may be expressed as follows:

$$\Phi_i(X) = \frac{k}{2(d+z'_i)}(X - x'_i)^2$$

In addition, $A'_i$ is a position where an image of $A_i$ is formed when there is not the light modulator 400, and this may be expressed to $$A'_i = (x'_i, z'_i) = (-Mx_i, 2L + M^2 z_i)$$

where $x'_i = -Mx_i$ represents a phase center by the lens.

Meanwhile, in the 3D qubit model, if the position of ith atom is $(x_{-i}, y_{-i}, z_{-i})$ and a position on the light modulator corresponding thereto is stored as $(X_i, Y_i)$, the light modulator may change the phase for the position corresponding to $(X_i, Y_i)$ as follows:

$$\Phi_{SLM}(X) = \sum_i \frac{k}{2f_i^F}(X - x'_i)$$

where X is defined in a range of $|X-X^c| < D_i/2$, and an intensity center, $X_i^c$ is calculated as follows:

$$X^c = f(x_i, z_i) = -Mx_i - \left(\frac{Mz_i + d/M}{f_1 - z_i}\right)x_i$$

The intensity center is a center of a programmed Fresnel lens generated by the light modulator and is a coordinate of a chief ray in the QIP.

Herein, k is a size of a wave vector, $$f_i^F = \frac{d(d+z'_i)}{z'_i}$$

is a Fresnel focal distance, and M=f2/f1, and M=f2/f1.

In addition, $D_i$ is a size (diameter) of the qubit fluorescent beam to which a Fresnel lens effect is applied in the QIP and may be calculated as follows:

$$D_i = \frac{2|d + M^2 z_i|NA}{M}$$

where NA is a numerical aperture of a lens. In the embodiment, the NA may be applied as a characteristic value of the first lens.

Figure 4B:
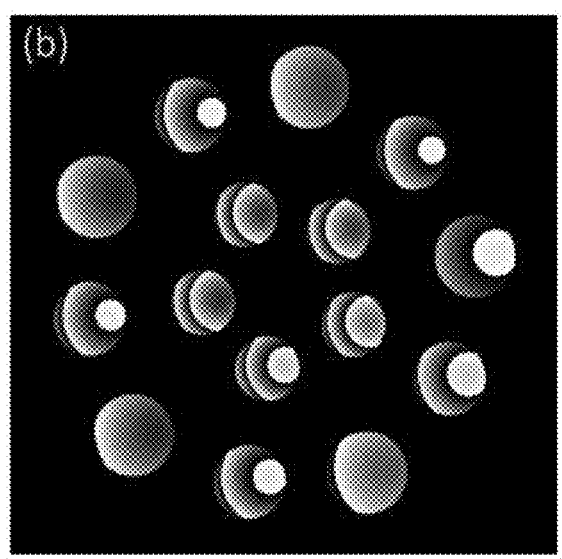
FIG. 4B is an exemplary diagram illustrating a hologram image by a light modulator.

FIG. 4B is an exemplary diagram illustrating a hologram image by a light modulator.

As described above, on the light modulator 400, each atom may be modulated to a predetermined phase and direction for each position corresponding to the positions of the atoms, and may be correctly imaged in the imaging unit 600 by changing the focal distance.

In different situations, a phase delay plate and a polarization plate may be provided between the first lens and the second lens. For example, the qubit fluorescent beam passing through the first lens 210 may have a polarization direction that is changed as it passes through a half wave plate, and only the qubit fluorescent beam having polarization previously set by the polarization plate positioned right behind the half wave plate may pass through. A quarter wave plate (QWP) may be used as the phase delay plate. Admittedly, at this time, it is preferable to change a polarization plate according to the QWP.

The phase delay plate and the polarization plate may be included according to the types and features of the light modulator 400, and may be unnecessary.

The qubit fluorescent beam passing through the light modulator 400 is collected again as is passes through the third lens 230, and is incident into the imaging unit 600.

The imaging unit 600 may be position on a final image plane (FIP), and may include an electron multiplying CCD (EMCCD). In addition, as the EMCCD is a recording element using accumulation and transmission of charge, it preferably functions as capturing a hologram image.

Figure 4C:
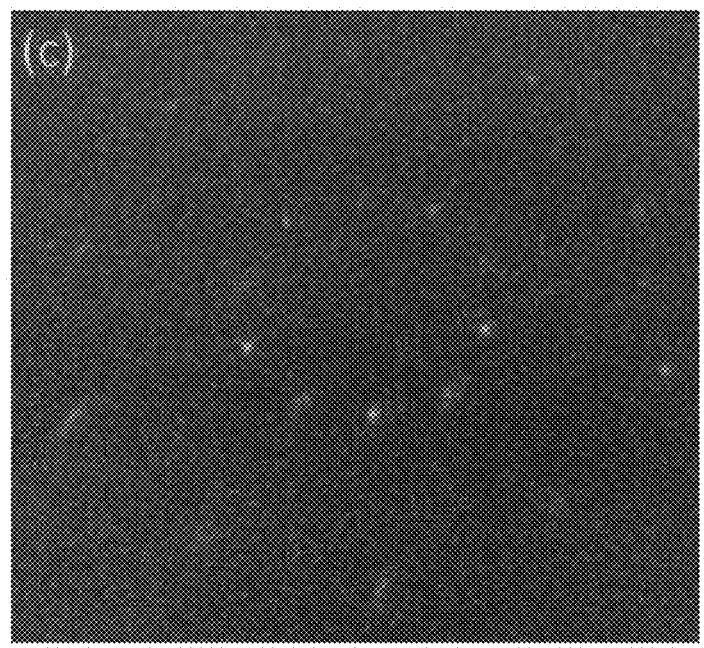
FIG. 4C is an experimental result diagram illustrating an image imaged in an imaging unit.
Figure 4D:
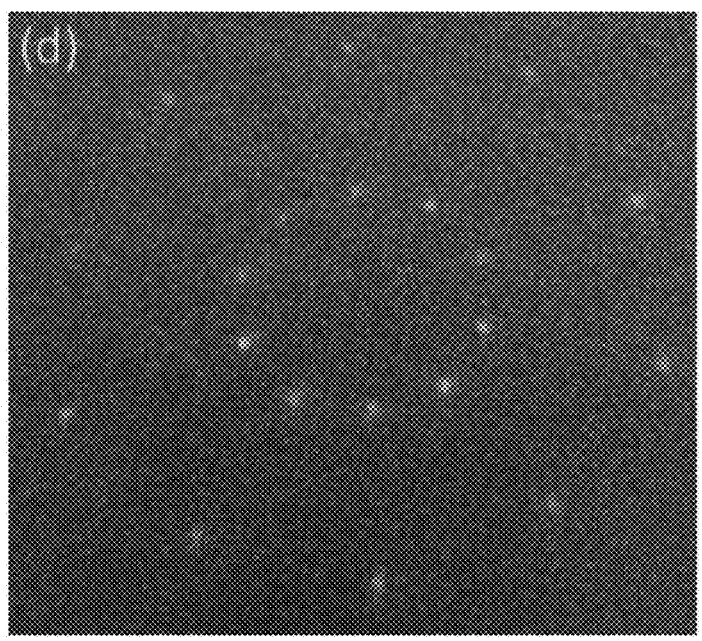
FIG. 4D illustrates a 3D image holographically modulated by the light modulator.

FIG. 4C illustrates a screen imaged by the imaging unit 600 when there is not the light modulator 400, and FIG. 4D illustrates a 3D image holographically modulated by the light modulator. When comparing FIG. 4C and FIG. 4D, FIG. 4C does not properly illustrate images of atoms having a different position of z, while in FIG. 4D, it can be understood that images of atoms arranged in three dimensions are correctly imaged on a 2D plane.

Next, referring to FIG. 5A to FIG. 5E, the inventor(s) of the present invention performed an experiment in which an image is generated using the 3D holographic imaging apparatus according to the present invention with respect to atoms spaced apart by +d, 0 and −d in the z direction and finely positioned in the x direction. Positions of three atoms may be displayed as A1=(ε,−d), A2=(ε,0) and A3=(ε,+d), respectively.

Figure 5A:
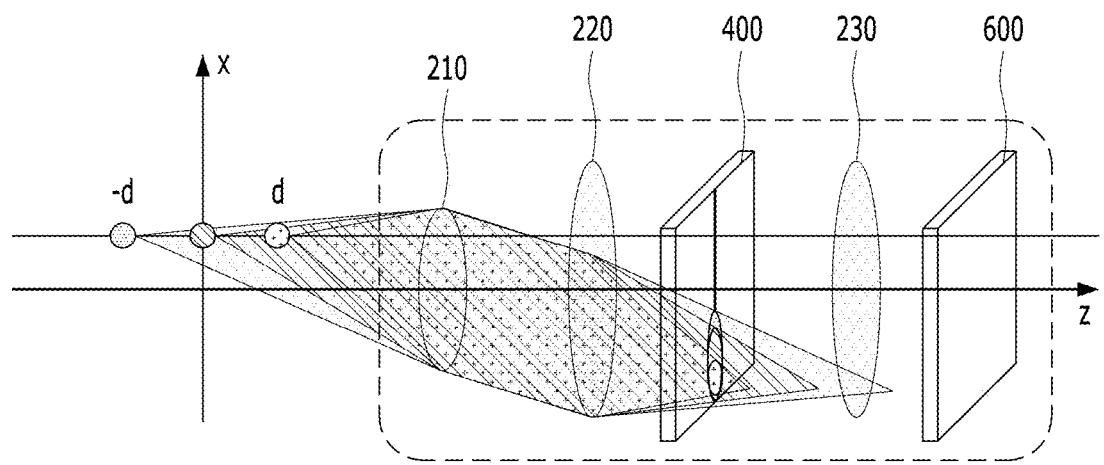
FIGS. 5A to 5E are experimental result diagrams illustrating the result of experiments for the 3D holographic imaging apparatus according to the present invention.
Figure 5B:
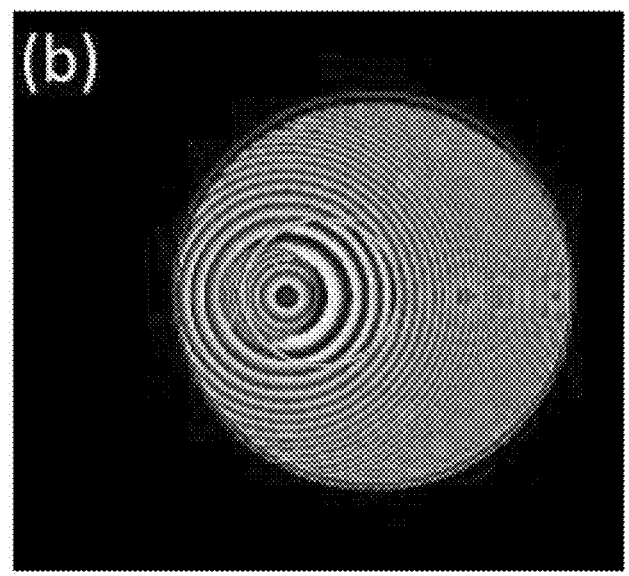
Figure 5C:
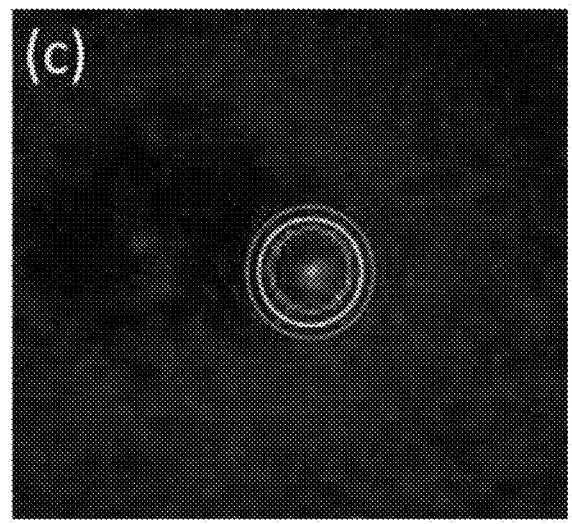

FIG. 5B illustrates phase correction by the light modulator having a state free from linear phase correction, and in this case, since three atoms overlapping one another are imaged in the FIP as illustrated in FIG. 5C, it is difficult to distinguish the atoms.

Figure 5D:
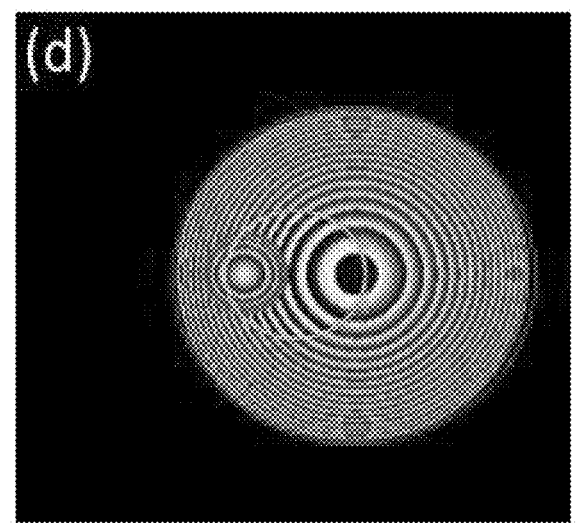
Figure 5E:
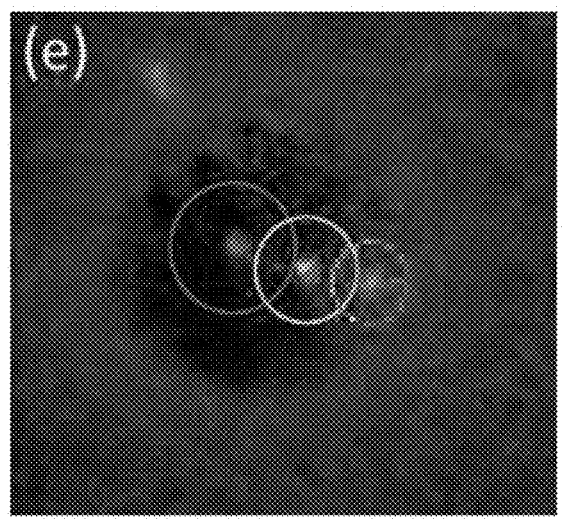

Meanwhile, FIG. 5D illustrates a holographic modulation scheme by the light modulator when adding the linear phase correction, and in this case, it can be understood that the three atoms are imaged on each separate position as illustrated in FIG. 5e.

Specifically, in the light modulator, a linear phase $\phi_i^L = k_{L_i} X$ is added to $\Phi_{SLM}(X)$ for the three atoms, respectively, and the performance of the linear phase correction leads to the same effect as that of moving a center of a Fresnel lens as illustrated in FIG. 5d. In other words, in the light modulator, a second phase is basically generated as follows:

$$\exp\left(ik\frac{x^2 + y^2}{2f}\right)$$

By additionally performing the linear phase correction to the second phase as follows, the atoms may be mapped to desired positions in the imaging unit. This way, the overlapping positions of the atoms may be separated from one another and may be definitely imaged.

$$\exp\left(ik\frac{x^2 + y^2}{2f}\right) \times \exp(ikL_i x) = \exp\left(ik\frac{(x - x_0)^2 + y^2}{2f}\right)$$

In addition, each phase center may be consistent with centers of intensity by properly controlling $kL_i$ in the linear phase.

Figure 6:
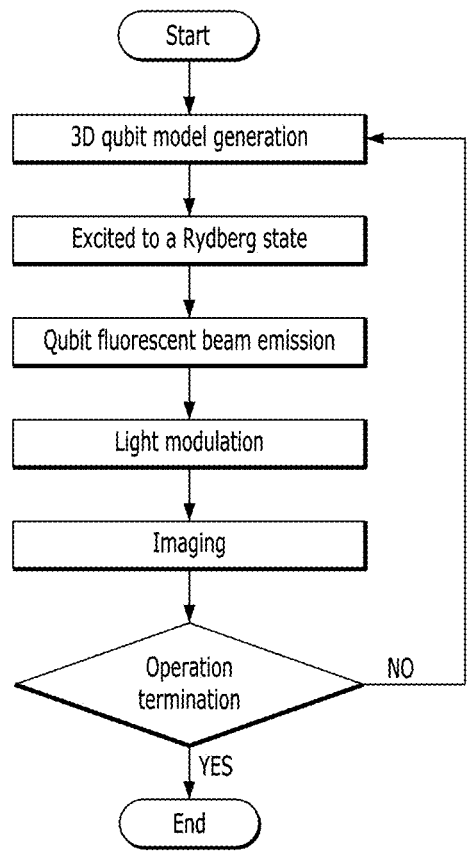
FIG. 6 is a flowchart illustrating a 3D holographic imaging method according to the present invention.

Next, a 3D holographic imaging method according to the present invention will be described with reference to FIG. 6.

First, the 3D qubit model is generated in a preparation step. The 3D qubit model is to generate the atoms in predetermined positions, and may pass through atom cooling and atom capturing steps.

In other words, in the atom cooling step, schemes such as a magneto optical trap (MOT), polarization gradient cooling, and the like may be used, and the atoms may be arranged in their desired positions using an optical tweezer.

When the 3D qubit model is generated, the atoms are excited to a Rydberg state to change qubits to their desired state, and in the state, the qubit fluorescent beams are emitted. The qubit fluorescent beams emitted by each atom have a route that is changed by passing through the lens unit, and phase modulation is generated in the positions corresponding to each atom by the light modulator intermediately positioned, resulting in generating a new hologram.

The modulated hologram image is incident to the imaging unit, and an image is generated by the imaging unit.

In a Rydberg quantum simulator, a new 3D qubit model may be generated for a next operation, and it is possible to perform a repetitive operation with the method described above.

As described above, the present invention has been described with reference to the exemplary embodiments. However, it will be appreciated by those skilled in the art that various modifications and changes of the present invention can be made without departing from the spirit and the scope of the present invention which are disclosed in the appended claims.

What is claimed is:
1. A 3D holographic imaging apparatus comprising:
a fluorescent unit configured to cause a plurality of qubits composing a 3D qubit model to emit a plurality of qubit fluorescent beams by applying an imaging beam;
a lens unit comprising configured to change the plurality of qubit fluorescent beams to a desired route;

a light modulator configured to modulate each phase of the plurality of qubit fluorescent beams for each predetermined position, and control a position of a focal point; and an imaging unit configured to image the plurality of qubit fluorescent beams modulated by the light modulator in a 2D image, wherein the lens unit comprises a first lens having a focal distance of f1 and configured to change routes of the plurality of qubit fluorescent beams emitted by the 3D qubit model and a second lens having a focal distance of f2 and configured to refract the plurality of qubit fluorescent beams passing through the light modulator to become a predetermined position of the focal point, wherein a primary image plane (PIP) vertical to an advancing direction of the plurality of qubit fluorescent beams is disposed at 2L, where L is f1+f2, and wherein the light modulator is disposed on quasi-image plane (QIP), which is parallel to the PIP and spaced apart from the PIP at a predetermined distance of d to an opposite direction of the advancing direction of the plurality of qubit fluorescent beams.

2. The 3D holographic imaging apparatus of claim 1, wherein a phase delay plate changing a polarization direction and a polarization plate passing only a specific polarization are installed between the first lens and the second lens.

3. The 3D holographic imaging apparatus of claim 1, wherein positions x, y and z of atoms belonging to the 3D qubit model, a position of the lens unit and a position of the light modulator are stored, and phases to be changed for each position on the XY plane of the light modulator are holographically modulated based on the stored positions x, y and z of atoms, the stored position of the lens unit, and the stored position of the light modulator.

* * * * *